United States Patent Office 3,442,696
Patented May 6, 1969

3,442,696
WATER RESISTANT LEATHERS AND FUR SKINS
Hans Markert and Rudi Heyden, Dusseldorf, Germany, assignors to Böhme Chemie Gesellschaft mit beschrankter Haftung, Dusseldorf-Benrath, Germany, a corporation of Germany
No Drawing. Filed Aug. 18, 1965, Ser. No. 480,768
Claims priority, application Germany, Oct. 10, 1964, B 78,869
Int. Cl. C14c 9/00
U.S. Cl. 117—141
4 Claims

ABSTRACT OF THE DISCLOSURE

A method and compositions for rendering furs and leather water resistant and to the said leather and furs so treated where the water-proofing agent is a condensation product of ethylene oxide and a highly branched alcohol of 12 to 20 carbon atoms.

PRIOR ART

In commonly assigned U.S. application Ser. No. 380,030, filed July 2, 1964, now Patent No. 3,402,071 the preparation of satisfactorily waterproofed leather and fur is described. The process comprises treating the leather and furs with solutions of condensation products of 1 to 4 moles of ethylene oxide with 1 mol of an organic compound having at least one unsaturated lipophilic radical and an exchangeable hydrogen atom bonded to an oxygen, sulfur or nitrogen atom in an organic solvent. The said treated leather has a very low water absorbability and a very low permeability to water under dynamic test conditions which makes it useful for leather subjected to heavy mechanical usage such as bottom, shoe top and technical leathers.

OBJECTS OF THE INVENTION

It is an object of the invention to provide a novel method for rendering leather and furs waterproof.

It is another object of the invention to provide novel compositions for rendering leather and furs waterproof.

It is a further object of the invention to provide novel waterproof furs and leather.

These and other objects and advantages of the invention will become obvious from the following detailed description.

THE INVENTION

The novel process of the invention for rendering furs and leather waterproof comprises impregnating said furs and leather with a solution of 5 to 40% by weight of at least one condensation product of 1 to 4 moles of ethylene oxide with an organic compound having at least one saturated branched lipophilic radical of 12 to 20 carbon atoms wherein 30 to 70% of the carbon atoms are in side chains and having attached to said radical an exchangeable hydrogen atom bonded to an atom selected from the groups consisting of oxygen, sulfur and nitrogen atoms in organic solvents.

The impregnating activity of the said condensation radicals is completely surprising since the corresponding straight chain, saturated organic compounds or condensation products thereof with 1 to 4 moles of ethylene oxide do not waterproof leathers in similar processes. Until now, satisfactory waterproofing of leather and furs could only be obtained with products having an unsaturated lipophilic radical as in application Ser. No. 380,030. The leather and furs of the process of the invention have the advantage over the products produced in application Ser. No. 380,030 of very light color and exceptional light stability. The condensation products used in the present process are practically completely colorless.

The condensation products useful for the impregnation may be prepared by condensation of 1 to 4 moles of ethylene oxide with branched high molecular weight alcohols, carboxylic acids, amines, carboxylic amides, sulfamides and mercaptans having 12 to 20 carbon atoms, 30 to 70% of which are side chain carbon atoms. Particularly preferred because of their superior activity are the condensation products of branched high molecular weight alcohols which may be prepared by the oxo synthesis from branched olefinic hydrocarbons or by the Guerbet reaction. With a low degree of chain branching such as in many Guerbet alcohols or from isobutylene in the oxo synthesis, the side chains should have at least four carbon atoms and with a high degree of chain branching such as from tetrapropylene in the oxo synthesis, shorter side chains in greater number may be present. The corresponding acids, amides, amines, mercaptans and sulfamides can be prepared from the said alcohols by known procedures.

The agents used acording to the invention, can be employed favorably in combination with 5 to 50% of citric acid esters or citric acid amides which still have in the molecule at least one free carboxyl group and of which at least one of the esterification or amidation components contain one unsaturated or branched high molecular, aliphatic hydrocarbon radical of 12 to 20 carbon atoms. Here, mixtures of the ethylene oxide addition products of the invention with mono-oleyl citric acid ester or citric acid ester of a highly branched aliphatic alcohol in organic solvents have given especially satisfactory results.

Examples of organic solvents in which the impregnating agents may be dissolved for employment in the present invention are trichloroethylene, perchloroethylene, gasoline, toluene, isopropanol and other lower alkanols, methylethyl ketone, cyclohexanone, butyl acetate, etc. The selection of the particular solvent will depend upon the solubility characteristics of the impregnating compound.

The compositions of the invention may be used alone or in combination with other compositions useful for water-proofing leather. The use of the present compositions with organic solutions of cationic-active, complex salts formed by condensation of polyvalent metal alcoholates with acid high molecular weight esters of phosphoric acid as described in United States Patent No. 2,855,417 is particularly desirable. The impregation with these agents may be performed simultaneously or in sequence.

Suitable alcoholates as described in Patent No. 2,885,417 are magnesium, titanium, zirconium or aluminum alcoholates wherein the alkyl radical has 1 to 12 carbon atoms, preferably lower alkyls. Examples of suitable alcoholates are aluminum isopropylate, aluminum butylate, aluminum octylate and aluminum dodecylate. Neutral alcoholates are usually used but basic alcoholates may also be used to form the complexes. Mixtures of various alcoholates may be used.

The acid esters of the phosphoric acids are the mono and diesters. The alcohol portion of the ester is derived from aromatic or aliphatic alcohols having more than six carbon atoms. The diesters may be used in admixture with the monoesters or esters whose alcohol radicals contain substituents or are interrupted by hetero atoms or groups containing hetero atoms. The acid portion of the ester may be phosphoric acid such as phosphoric alkylamides, alkylphosphoric acid or alkylphosphinic acid. Examples of suitable esters are phosphoric acid mono-octyl ester, phosphoric acid mono-dodecyl ester, phosphoric acid mono-oleyl ester, phosphoric acid mono-alkylphenol ester wherein the alkyl has 3 to 18 carbon atoms, phosphoric acid mono-naphthenyl esters, phosphoric acid mono-abietyl ester, etc.

The complexes are usually formed in the presence of organic solvents such as isopropanol, toluene, aliphatic halogens or trichloroethylene wherein the ratio of metal alcoholate to phosphoric acid ester is 1:0.5 to 1.5 but other molar ratios may be used. In some instances the complex may be formed by using solutions of the starting material.

By dissolving the said complexes in the compositions of the present invention, a one step impregnation may be used. If necessary, complex stabilizers such as acetylacetone, acetylacetate, etc., may be added to the composition.

All types of leather and furs may be impregnated with the aid of the impregnating compositions of the invention. Particularly surprising was the fact that not only aluminum-tanned, chrome-tanned and chrome-combination-tanned leathers can be made water-resistant therewith, but also that synthetically or vegetable-tanned leather can be made water-repellent. This could not have been foreseen because synthetically or vegetable-tanned leathers do not, as a rule, comprise any groups which could combine with the said derivatives. Also a considerably improved impregnation effect can be achieved with mineral-tanned leather if the compounds are used in solution in organic solvents instead of in aqueous dispersions.

The treated leather has an excellent water-repellent effect and particularly does not permit water penetration while remaining soft and supple and uninfluenced in its drying and finishing properties. The leather has a particularly low water absorption under static as well as dynamic conditions and the leather is not hardened and retains a light color even under strong light. The method of the invention is particularly useful in the manufacture of modern, non-fatted waterproof leather. Finished leather for uppers of shoes and sole leather may be impregnated with the compositions of the invention.

The leather may be treated by any of the usual techniques such as brushing, immersion, spraying or surface application machines. The compositions of the invention should be used in sufficient amounts so that there is 2 to 25%, preferably 5 to 10%, of the impregnating agent based on the weight of the leather to be treated present in the treatment. After the composition has been applied to the leather, the leather is slowly dried in air or in a drying device at slightly elevated temperatures.

For application of the waterproofing agent by the spray method, solvent mixtures with high boiling points, such as heavy fractions of gasoline, toluene or xylene are suitable. By addition of small amounts of mineral oils it is possible to apply the impregnating agents so they will not adhere excessively to the surface of the leather being sprayed, but rather penetrate into the leather. Low boiling point solvents are unsuitable for spraying because they evaporate too rapidly during spraying and the impregnating agents are deposited primarily on the surface of the leather. If the immersion method is used, the distribution of the impregnating agent in the leather may also be controlled by changing the high boiling point solvents.

The impregnation effect, especially the water-repellent effect of the leather surface, may be further improved if silicone oils and/or hard waxes are added to the compositions of the invention. The term "silicone oils" is intended to include primarily the known bi- and tri-functional methylsiloxanes with reactive hydrogen atoms, as well as other polymerizates of organo-silicon compounds which are characterized by a —Si—O—Si— group or also by other bonds, such as —Si—CH$_2$—Si— or —Si—C$_6$H$_4$—Si—

In the silicones the silicon atoms may be substituted with organic radicals, such as alkyl, aryl, aralkyl, alkylaryl or alkoxy groups. Of particular interest are those organo-silicon polymers which contain not only organic radicals, such as methyl, but also hydrogen atoms. These products are commercially available in the form of solutions in organic solvents, such as methylene chloride, which, in addition, usually contain catalysts, such as tetrabutyl esters of titanic acid. Suitable hard waxes are natural or synthetic wax products, such as paraffin wax, Carnauba wax and particularly Montan wax, or ester waxes and carbonamide waxes of a synthetic nature. The various components may readily be dissolved in the compositions. The additives increase the waterproofing effect, so that smaller quantities of the compositions of the invention may be used if these additives are employed simultaneously.

In the following examples there are described several preferred embodiments to illustrate the invention. However, it should be understood that the invention is not intended to be limited to the specific embodiments.

Example I

Samples of a chromium-tanned boxcalf leather were immersed for 10 minutes in 10% solutions of the ethylene oxide condensation products of branched alcohols, set forth in Table I. The solvent mixture consisted to equal parts of isopropanol and benzine (boiling point=110 to 140° C). Then, the leather samples were dried overnight in air and then for one hour at 80° C. The examination of these samples was conducted on the Maeser-machine and the number of bends, until water penetration occurred, were determined. The test values are summarized in Table I.

TABLE I

| Compound tested: | Water penetration after bends |
|---|---|
| Untreated leather | 95 |
| 1 mol of 2-octyldodecyl-1-alcohol+3 moles of ethylene oxide (obtained by Guerbet reaction) | 36,000 |
| 1 mol of 2 - octyldodecyl - 1 - alcohol+4 moles of ethylene oxide (obtained by Guerbet reaction) | 32,000 |
| 1 mol of 2-hexyldecyl-1-alcohol+3 moles of ethylene oxide | 6,500 |
| 1 mol of isotridecyl-1-alcohol+2 moles of ethylene oxide (oxo synthesis with tetrapropylene) | 14,000 |

Example II

A bottom leather tanned with vegetable synthetics was immersed for 10 minutes in a 10% solution of a condensation product of 4 moles of ethylene oxide with 1 mole of 2-octyldodecyl-1-alcohol. The solvent mixture consisted of 2 parts of isopropanol and 7 parts of benzine (boiling point=110 to 140° C.). Then, the leather was dried in air, and after climatization at 20° C. and 65% of atmospheric moisture, the dynamic waterproofness was ascertained by the penetrometer test, resulting in the values of Table II.

TABLE II

| | Water penetration after minutes | Percent of water absorption after 1 hour | Water admission after 1 hour |
|---|---|---|---|
| Untreated leather | 4 | 53 | 2.5 |
| 1 mol of 2-octyldodecyl-1-alcohol [1] plus 4 moles of ethylene oxide | 350 | 22 | 0.0 |

[1] Obtained with Guerbet-reaction.

Various modifications of the compositions and method of the invention may be made without departing from the spirit or scope thereof and it is to be understood that the invention is to be limited only as defined in the appended claims.

Example III

Samples of a conventional dressed, water-proof leather were soaked for a period of 10 minutes in a 20% benzine solution (boiling ranges 110 to 140° C.) of the mixture of an addition product of 3 mols of ethylene oxide per 1 mol of 2-octyldodecyl-1-alcohol (obtained by Guerbet reaction) with a mono-oleyl citric acid ester in a ratio of 1:2.

After slow drying in air, the treated samples and samples of the water-proof leather not treated according to the invention were examined as to their absorption of water and their water-resistance, and the following values listed in the table below were obtained.

|  | Water absorption according to Kubelka in percent after— | | | Water penetration penetrometer test, minutes |
| --- | --- | --- | --- | --- |
|  | 30 min. | 2 hrs. | 24 hrs. | |
| Untreated | 68 | 84 | 106 | 22 |
| Treated sample | 28 | 37 | 43 | 820 |

Example IV

Samples of a bottom leather tanned with vegetable synthetics were immersed for a period of 10 minutes in a 20% perchloroethylene solution of the mixture of an addition product of 3 mols of ethylene oxide per 1 mol of 2-octyldodecyl-1-alcohol (obtained by Guerbet reaction) with a mono-oleyl citric acid ester and a condensation product of aluminium isopropylate and an acid dodecylphosphoric acid ester mixture in a ratio of 1:1:1.

After slow drying in air, the treated samples and samples of the water-proof leather not treated according to the invention were examined as to their absorption of water and their water-resistance, and the following values listed in the table below were obtained.

|  | Water absorption according to Kubelka in percent after— | | | Water penetration penetrometer test, minutes |
| --- | --- | --- | --- | --- |
|  | 30 min. | 2 hrs. | 24 hrs. | |
| Untreated sample | 80 | 92 | 104 | 25 |
| Treated sample | 32 | 39 | 46 | 750 |

We claim:

1. A method of waterproofing leather and furs which comprises impregnating the said furs and leather with a solution of 5 to 40% by weight of (A) at least one condensation product of 1 to 4 moles of ethylene oxide with a saturated branched alcohol of 12 to 20 carbon atoms wherein 30 to 70% of the carbon atoms are in side chains in an organic solvent wherein the amount of said condensation product is 2 to 25% by weight of the leather and furs.

2. A method of waterproofing leather and furs which comprises impregnating the said leather and furs with a solution of 5 to 40% by weight of (A) at least one condensation product of 1 to 4 moles of ethylene oxide with a saturated branched alcohol of 12 to 20 carbon atoms wherein 30 to 70% of the carbon atoms are in side chains and (B) 5 to 50% by weight of a citric acid ester having at least one free carboxyl group and the alcohol portion being selected form the group consisting of branched saturated and unsaturated, high molecular, aliphatic hydrocarbon radicals of 12 to 20 carbon atoms in an organic solvent.

3. A method of waterproofing leather and furs which comprises impregnating the said leather and furs with a solution of 5 to 40% by weight of (A) at least one condensation product of 1 to 4 moles of ethylene oxide with a saturated branch alcohol of 12 to 20 carbon atoms wherein 30 to 70% of the carbon atoms are in side chains and (B) cationic-active complex salts formed by condensation of an aluminum alkyl alcoholate having 1 to 12 alkyl carbons and acid of mono and diesters of alcohols of at least 6 carbon atoms of phosphoric acid in an organic solvent.

4. The leather and furs produced by the method of claim 1.

References Cited

UNITED STATES PATENTS

| 3,010,780 | 11/1961 | Plapper et al. | 117—135.5 XR |
| 3,024,198 | 3/1962 | Harrington et al. | |
| 3,048,265 | 8/1962 | Hackhel et al. | 106—13 XR |
| 3,048,266 | 8/1962 | Hackhel et al. | 106—13 XR |
| 3,106,478 | 10/1963 | Heyden et al. | 106—287 XR |

JULIUS FROME, *Primary Examiner.*

L. HAYES, *Assistant Examiner.*

U.S. Cl. X.R.

106—2, 287; 117—142; 252—8.57